United States Patent
Mitchell et al.

(10) Patent No.: US 6,947,627 B2
(45) Date of Patent: Sep. 20, 2005

(54) COMPACT OPTICAL SWITCHES

(75) Inventors: Thomas A. Mitchell, Nazareth, PA (US); Michelle M. Stone, Hellertown, PA (US)

(73) Assignee: Agilent Technologies, Inc., Palo Alto, CA (US)

( * ) Notice: Subject to any disclaimer, the term of this patent is extended or adjusted under 35 U.S.C. 154(b) by 58 days.

(21) Appl. No.: 10/675,277

(22) Filed: Sep. 30, 2003

(65) Prior Publication Data

US 2005/0069245 A1 Mar. 31, 2005

(51) Int. Cl.[7] .............................. G02B 6/26; G02B 6/42
(52) U.S. Cl. ........................................... 385/17; 385/16
(58) Field of Search .............................. 385/15, 16, 17, 385/18

(56) References Cited

U.S. PATENT DOCUMENTS

| | | | |
|---|---|---|---|
| 5,692,077 A | 11/1997 | Stone et al. | |
| 5,771,320 A | 6/1998 | Stone | |
| 6,320,998 B1 | 11/2001 | Okayama et al. | |
| 6,445,840 B1 | 9/2002 | Fernandez et al. | |
| 6,748,130 B2 * | 6/2004 | Oikawa | 385/17 |
| 6,768,573 B1 * | 7/2004 | Nishi et al. | 359/250 |
| 2003/0059154 A1 | 3/2003 | Sato | |

* cited by examiner

Primary Examiner—Brian Healy
Assistant Examiner—Charlie Peng

(57) ABSTRACT

Systems and methods to provide compact, scalable, low loss optical switches. An optical switch of this invention includes two or more directing elements, each directing element having two or more sections. Each section includes a switchable deviating element. During operation of a two element optical switch of this invention, the first section of the first element can selectively deviate in a first direction the input beam for that section. The second section of the first element can selectively deviate in a second direction the input beam for that section. The optical beams transmitted by the first element constitute the input beams for the second element. The first section of the second element can selectively deviate in a third direction, which can be the same as the first or second direction, the input beam for that section. The second section of the second element can selectively deviate in a fourth direction, which can be the same as the first or second direction, the input beam for that section. By selecting the relationship between the third direction and the first or second direction and the relationship between the fourth direction and the first or second direction, different designs are obtained. Also, multiple input switches can be obtained by either repeating the first section for half of multiple inputs followed by repeated second sections (also refereed to as a segmented design) or by interleaving first and second sections.

13 Claims, 10 Drawing Sheets

Prior Art
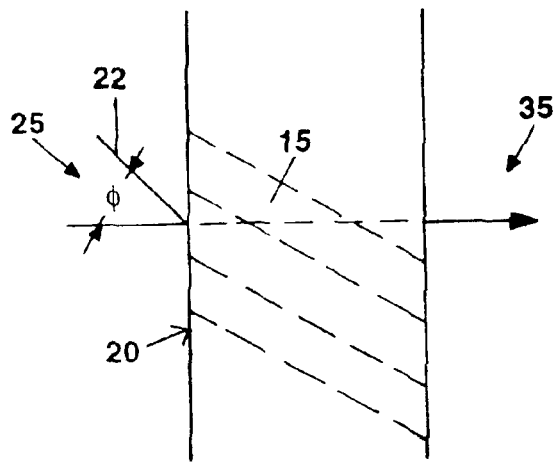
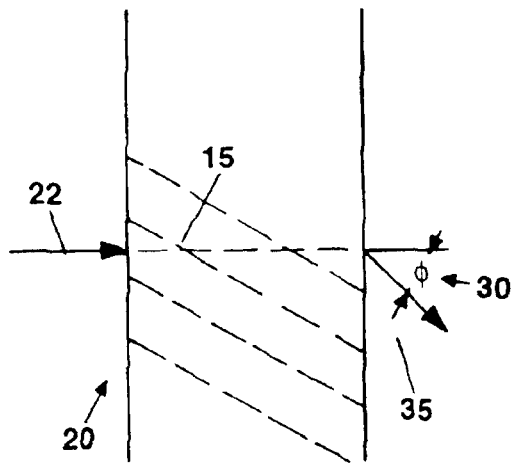
FIG. 1A    FIG. 1B
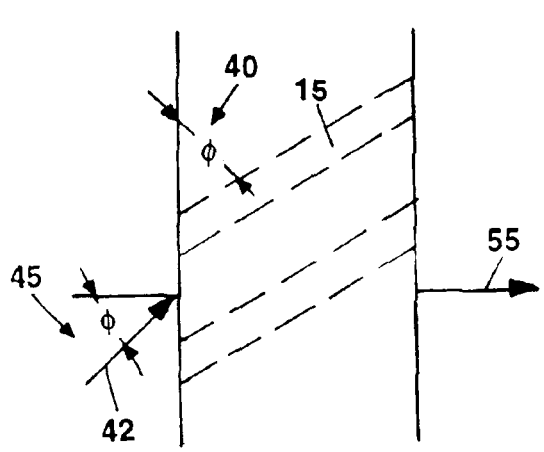
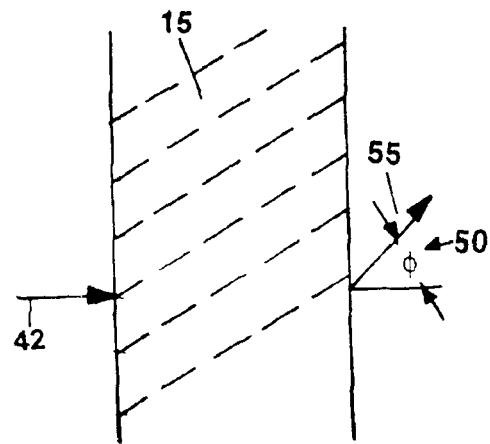
FIG. 1C    FIG. 1D

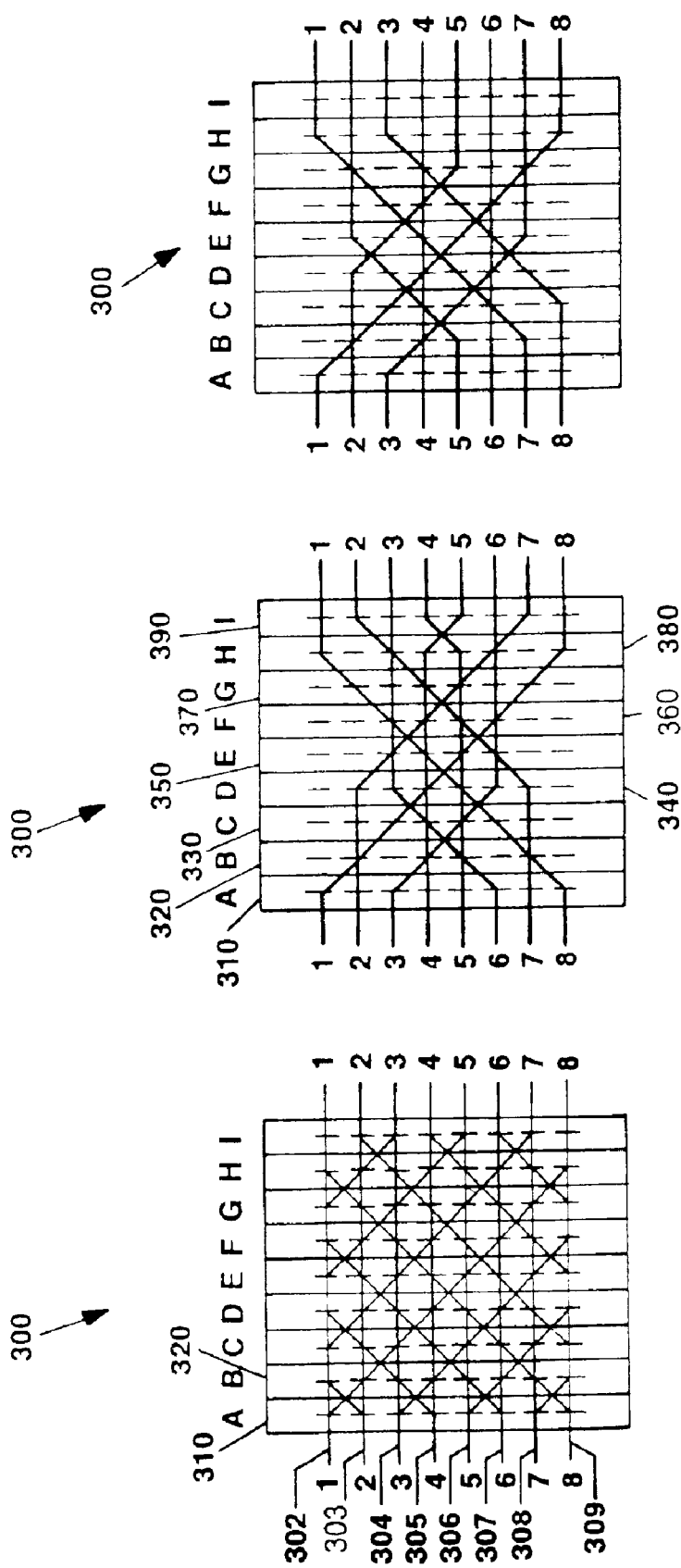

COMPACT OPTICAL SWITCHES

FIELD OF THE INVENTION

This invention relates generally to optical switches utilized in altering the path of an optical beam, and, more particularly, to compact, scalable optical switches.

BACKGROUND OF THE INVENTION

With the advent of substantial new uses for high bandwidth digital and analog electro-optic systems, there exists a greater need to effectively control the routing and switching capability of optical signals from among many possible paths. This is especially true in digital computing systems where signals must be routed among processors; in analog systems such as phased array radar; and in the switching of high bandwidth optical carriers in communication systems. However, it should be realized that these are just several of numerous electro-optic systems which require the use of an optical switching mechanism.

Most optical switching is performed utilizing MEMS mirrors or opto-electronic switches fabricated on materials like lithium niobate. Such switches are either expensive or bulky or complex. Some compact switches have been constructed for a given number of inputs and outputs but typically the designs do not scale to a larger number of inputs and outputs and these switches typically exhibit high loss. There is a need for optical switches that are compact, linearly scalable and low loss.

It is therefore an object of this invention to provide compact optical switch designs.

It is a further object of this invention to provide compact optical switch designs that scale linearly with the number of inputs.

BRIEF SUMMARY OF THE INVENTION

The objects set forth above as well as further and other objects and advantages of the present invention are achieved by the embodiments of the invention described hereinbelow.

The present invention overcomes problems associated with insertion loss, size and compactness, and scaling that may be present in current optical switching systems. The present invention includes both interleaved and segmented switchable grating based optical switches.

An optical switch of this invention includes two or more directing elements, each directing element having two or more sections. Each section includes a switchable deviating component. During operation of a two element optical switch of this invention, the first section of the first element can selectively deviate in a first direction the input beam for that section. The second section of the first element can selectively deviate in a second direction the input beam for that section. The optical beams transmitted by the first element constitute the input beams for the second element. The first section of the second element can selectively deviate in a third direction, which can be the same as the first or second direction, the input beam for that section. The second section of the second element can selectively deviate in a fourth direction, which can be the same as the first or second direction, the input beam for that section. By selecting the relationship between the third direction and the first or second direction and the relationship between the fourth direction and the first or second direction, different designs are obtained. Also, multiple input switches can be obtained by either repeating the first section for half of multiple inputs followed by repeated second sections (also refereed to as a segmented design) or by interleaving first and second sections.

For a better understanding of the present invention, together with other and further objects thereof, reference is made to the accompanying drawings and detailed description and its scope will be pointed out in the appended claims.

BRIEF DESCRIPTION OF THE SEVERAL VIEWS OF THE DRAWING

FIGS. 1(a)–1(d) depict graphical schematic representations of asymmetric Bragg-volume gratings (PRIOR ART);

FIGS. 4(a)–4(c) depict graphical schematic representations of some of the possible states of an embodiment of an 8×8 optical switch of this invention;

DETAILED DESCRIPTION OF THE INVENTION

Figures 2A, 2B, 2C, 2D, 2E, 2F:
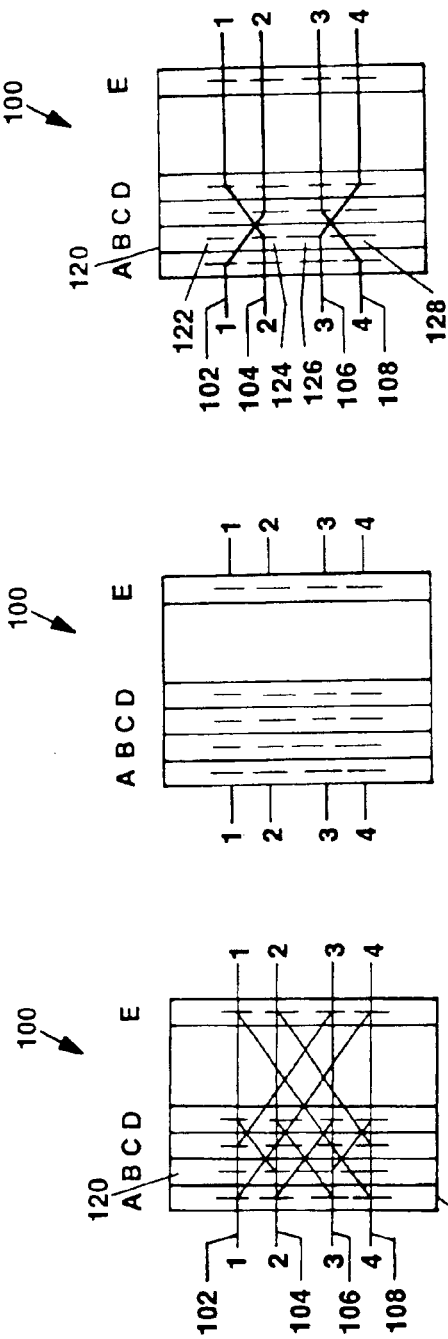
FIGS. 2(a)–2(f) depict graphical schematic representations of some of the possible states of an embodiment of a 4×4 optical switch of this invention.

In order to better understand the present invention described below, it should be noted that certain terms used in the description of the invention have interchangeable usage. For example, the term "optical" refers not only to optical components, but also to electro-optical components and the terms "optical beam" and "electromagnetic radiation beam" may be used interchangeably.

Furthermore, terms such as "beam paths" and "channels" may also be interchanged, in certain instances, based upon their usage as recognized in the art.

In addition, identical components may be referred to with identical reference numerals within the specification and drawings for simplifying an understanding of the various components of this invention.

Systems and methods to provide compact, scalable, low loss optical switches are disclosed hereinbelow.

An optical switch of this invention includes two or more directing elements, each directing element having two or more sections. Each section includes a switchable deviating component. During operation of a two element optical switch of this invention in which each element has two sections, the first section of the first element can selectively deviate in a first direction the input beam for that section. The second section of the first element can selectively deviate in a second direction the input beam for that section. The optical beams transmitted by the first element constitute the input beams for the second element. The first section of the second element can selectively deviate in a third direction, which can be the same as the first or second direction, the input beam for that section. The second section of the second element can selectively deviate in a fourth direction, which can be the same as the first or second direction, the input beam for that section. During operation of the above described embodiment of the optical switch of this invention, a desired output is obtained by selectively deviating the input beams and the transmitted beams at each section.

In one embodiment, the optical switch of this invention also includes a free space propagation region and an output directing element. The output directing element also has two or more sections, each section including a switchable deviating element. During operation of that embodiment of the optical switch of this invention, the free space propagation region receives two or more preceding element transmitted beams. The preceding element transmitted beams propagate through the free space propagation region and the propagated beams provide the input to the output directing element.

In one embodiment, the switchable deviating element utilized in the optical switches of this invention is a switchable volume grating such as that described in U.S. Pat. No. 5,771,320, herein incorporated by reference. The switched gratings described in U.S. Pat. No. 5,771,320 can be optically switched, electrically switched, polarization switched, or switched based on other mechanisms. The grating can be "blazed" in order to determine the direction of deviation for a given angle of incidence of the input beam. In one embodiment, the "blazing" can be achieved by controlling the fringe tilt angle as in the asymmetric thick (Bragg) volume grating described in U.S. Pat. No. 5,692,077, herein incorporated by reference. FIGS. 1a through 1d depict the dependence of direction of deviation 30, 50 on the angle of incidence 25, 45 of the input beam 22, 42 for a negative fringe tilt angle 20 (FIGS. 1a, 1b) (fringe tilt angle is hereinafter also referred to as the blazing state of the grating) and for a positive fringe tilt angle 40 (FIGS. 1c, 1d). The direction of deviation 30, 50 is determined by the angle of incidence 25, 45 of the input beam 22 and the fringe tilt angle 20, 40.

It should be noted that different embodiments of the optical switch of this invention may be obtained by the selecting the manner in which the direction is determined. In one embodiment utilizing switchable gratings, the blazing state of the grating is selected and the deviation direction is consistent with that blazing state. Other embodiments are possible and are still within the scope of this invention.

In one embodiment of a multiple input optical switch of this invention, each directing element includes two groups of sections. In each group, each section includes a switchable volume grating having the same blazing state and capable of deviating an input beam in the direction consistent with that blazing state. FIG. 2(a) depicts all possible switching paths of an embodiment of a four (4) input optical switch 100 of this invention in which each directing element includes two groups of sections and FIGS. 2(b) through 2(f) depict some of the possible states of that embodiment of a four (4) input optical switch 100 of this invention. Referring to FIG. 2(a), two input beams 102, 104 are received by two upper sections of a first directing element 110 and two other beams 106, 108 are received by two lower sections of the first directing element 110. Referring to FIG. 2(e), the switchable grating in each of the two upper sections 112, 114 of the first directing element 110 is capable of deviating the corresponding input beam 102, 104 in a first direction corresponding to a blazing state similar to that of FIGS. 1a, 1b (hereinafter referred to as the first direction). Also referring to FIG. 2(e), the switchable grating in each of the two lower sections 116, 118 of the first directing element 110 is capable of deviating the corresponding input beam 106, 108 in a second direction corresponding to a blazing state similar to that of FIGS. 1c, 1d (hereinafter referred to as the second direction).

Referring to FIG. 2(c), the switchable grating in each of the two upper sections 122, 124 of the second directing element 120 is capable of deviating one of the beams transmitted through the first directing element 110 in the second direction. Referring again to FIG. 2(c), the switchable grating in each of the two lower sections 126, 128 of the second directing element 120 is capable of deviating another one of the beams transmitted through the first directing element 110 in the first direction.

The pattern of the first two elements 110, 120 repeats in succeeding directing elements, from the third directing element 130 to the 5th directing element 160 as can be seen from FIGS. 2(c), 2(d), 2(e), 2(f). That is, the switchable grating in each of the two upper sections of the third directing element 130 is capable of deviating one of the beams transmitted through a preceding directing element in the first direction and the switchable grating in each of the two lower sections of the third directing element 130 is capable of deviating another one of the beams transmitted through the preceding directing element in the second direction. The switchable grating in each of the two upper sections of the fourth directing element 140 is capable of deviating one of the beams transmitted through the preceding directing element in the second direction and the switchable grating in each of the two lower sections of the fourth directing element 140 is capable of deviating another one of the beams transmitted through the preceding directing element in the first direction. The pattern repeats in the fifth directing element 160. The switchable grating in each of the two upper sections of the fifth directing element 160 is capable of deviating one of the beams transmitted through a preceding directing element in the first direction and the switchable grating in each of the two lower sections of the fifth directing element 160 is capable of deviating another one of the beams transmitted through the preceding directing element in the second direction, as shown in FIG. 2(d).

The optical switch 100 of this invention shown in FIGS. 2(a) through 2(e) includes a free space propagation region 150. The free space propagation region 150 receives the preceding element transmitted beams. The preceding element transmitted beams propagate through the free space propagation region 150 and the propagated beams provide the input to the fifth directing element 160, which is the output directing element.

The above embodiment can be generalized to a 2N input beam switch, N being a positive integer greater than zero. The generalized embodiment of the above described optical switch 100 of this invention has 2N+1 directing elements. In the generalized embodiment, the first directing element includes two groups of N sections. Each section in the first group of the first directing element receives one input beam and has a switchable grating capable of deviating the input beam in the first direction. Each section in each second group also receives one input beam and has a switchable grating capable of deviating the corresponding input beam in the second direction.

The second directing element in the generalized embodiment also includes two groups of N sections. Each section in the first group of the second directing element receives one of the 2N first element transmitted beams and also has a switchable grating capable of deviating the transmitted beam in the second direction. Each section in the second group of the second directing element receives another beam from the 2N first element transmitted beams and has a switchable grating capable of deviating the another transmitted beam in the first direction. The succeeding elements, from the third element to the 2Nth+1 element, repeat the pattern of the first two elements. During operation of the above embodiment of optical switch of this invention, a desired output is obtained by selectively deviating the input beams and the transmitted beams at each section.

Figure 3A:
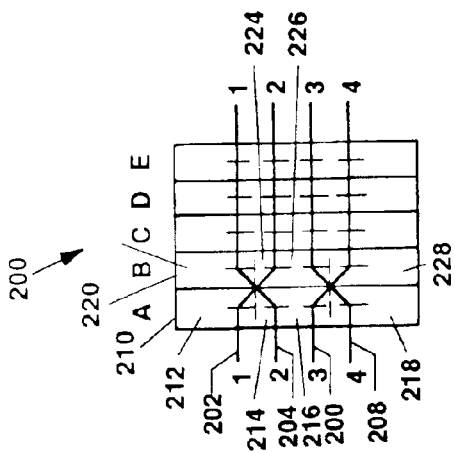
FIGS. 3(a)–3(f) depict graphical schematic representations of some of the possible states of another embodiment of a 4×4 optical switch of this invention.
Figure 3B:
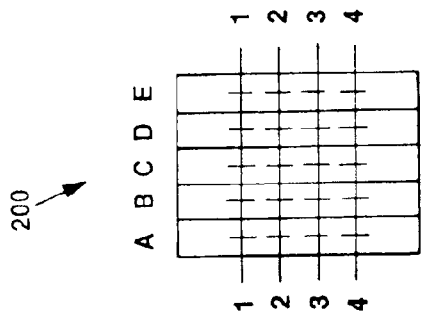
Figure 3C:
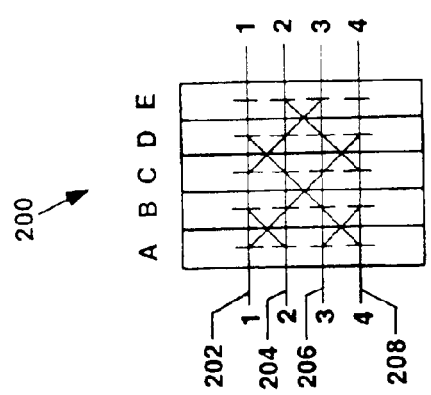
Figure 3D:
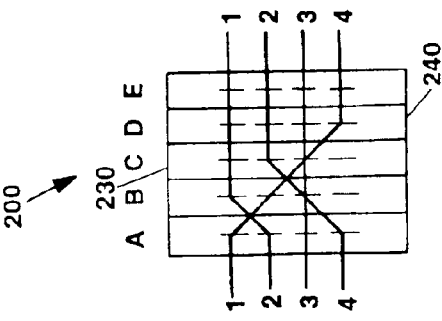
Figure 3E:
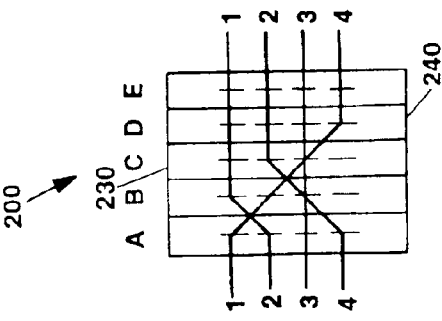
Figure 3F:
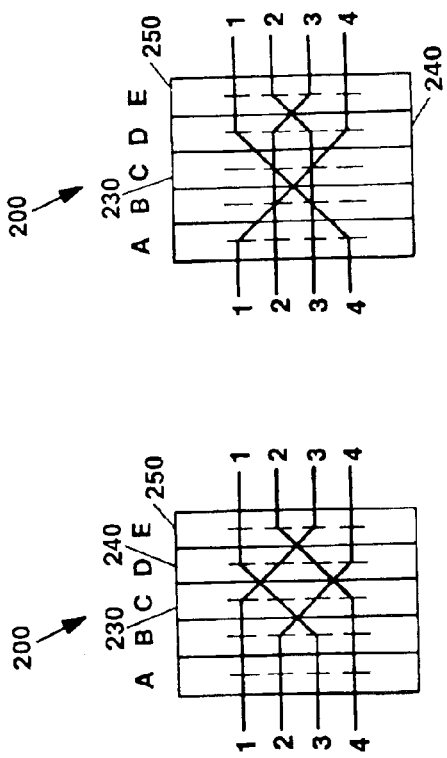

In another embodiment of a multiple input optical switch of this invention, each directing element includes a number of groups of sections, the number being equal to half the number of input beams. FIG. 3(a) depicts all possible switching paths of an embodiment of a four (4) input optical switch 200 of this invention in which each directing element includes two groups of sections and FIGS. 3(b) through 3(f) depict some of the possible states of that embodiment of a four (4) input optical switch 200 of this invention. Referring to FIGS. 3(a) and 3(c), the first directing element 210 receives two input beams 202, 204 at the first group of two sections 212, 214. The first section 212 in the first group has a switchable volume grating capable of deviating the first input beam 202 in the first direction. The second section 214 in the first group has a switchable grating capable of deviating the second input beam 204 in the second direction. The second group of two sections 216, 218 in the first directing element 210 receives two input beams 206, 208. The second group of two sections 216, 218 is similar to the first group of two sections 212, 214. The first section 216 in the second group has a switchable grating capable of deviating the corresponding input beam 206 in the first direction. The second section 218 in the second group has a switchable grating capable of deviating the corresponding input beam 208 in the second direction.

Referring to FIG. 3(c), the first group of two sections 222, 224 of the second directing element 220 receives two of the four first element transmitted beams. The first section 222 in the first group has a switchable grating capable of deviating one of the four first element transmitted beams in the second direction. The second section 224 in the first group has a switchable grating capable of deviating another one of the four first element transmitted beams in the first direction. The second group of two sections 216, 218 in the first directing element 210 receives another two of the four first element transmitted beams. The second group of two sections 226, 228 is similar to the first group of two sections 222, 224. The first section 226 in the second group has a switchable grating capable of deviating the corresponding first element transmitted beam in the second direction. The second section 228 in the second group has a switchable grating capable of deviating the corresponding first element transmitted beam in the first direction.

The pattern of the first two elements 210, 220 repeats in succeeding directing elements, from the third directing element 230 to the fifth directing element 250, as can be seen from FIGS. 3(c), 3(d), 3(e), 3(f). That is, the third directing element 230 includes two groups of sections. In each group of section of the third directing element 230, the first section in each group has a switchable grating capable of deviating the corresponding second element transmitted beam in the first direction. The second section in each group has a switchable grating capable of deviating the corresponding second element transmitted beam in the second direction. The fourth directing element 240 also includes two groups of sections. In each group of section of the fourth directing element 240, the first section in each group has a switchable grating capable of deviating the corresponding third element transmitted beam in the second direction. The second section in each group of the fourth directing element has a switchable grating capable of deviating the corresponding third element transmitted beam in the first direction. The fifth directing element is similar to the first and third directing elements. That is, the fifth directing element 250 also includes two groups of sections and the first section in each group has a switchable grating capable of deviating the corresponding fourth element transmitted beam in the first direction. The second section in each group from the fifth directing element 250 has a switchable grating capable of deviating the corresponding fourth element transmitted beam in the second direction. FIG. 4(a) depicts all possible switching paths of an embodiment of an 8×8 optical switch 300 of this invention similar to the above described 4×4 optical switch 200 and FIGS. 4(b) and 4(c) depict two of the possible states of that embodiment of an 8×8 optical switch 300 of this invention. In the embodiment of an eight (8) input optical switch 300 of this invention each directing element includes four groups of sections. The first section in each group of the first directing element 310 has a switchable grating capable of deviating the corresponding input beam from the eight input beams 302, 303, 304, 305, 306, 307, 308, 309 in the first direction. The second section in each group of the first directing element 310 has a switchable grating capable of deviating the corresponding input beam in the second direction. The first section in each group of the second directing element 320 has a switchable grating capable of deviating one of the eight first element transmitted beams in the second direction. The second section in each group of the second directing element 320 has a switchable grating capable of deviating another one of the eight first element transmitted beams in the first direction. The pattern of the first two elements 310, 320 repeats in succeeding directing elements, from the third directing element 330 to the ninth directing element 390, as can be seen from FIGS. 4(a), 4(b), and 4(c).

The above embodiment can be generalized to a 2N input beam switch, N being a positive integer greater than zero. The generalized embodiment of the above described optical switches 200, 300 of this invention has 2N+1 directing elements. In the generalized embodiment, the first directing element includes N groups of sections, each group from the N groups including two sections. The first section in each group of the first directing element receives one input beam and has a switchable grating capable of deviating the input beam in the first direction. The second section in each group receives another input beam and has a switchable grating capable of deviating that input beam in the second direction.

The second directing element in the generalized embodiment of the above described optical switches 200, 300 of this invention also includes N groups of sections, each group from the N groups also including two sections. The first section in each group of the second directing element receives one of the 2N first directing element transmitted beams and also has a switchable grating capable of deviating the transmitted beam in the second direction. The second section in each group of the second directing element receives another beam from the 2N first directing element transmitted beams and has a switchable grating capable of deviating the another transmitted beam in the first direction. The succeeding elements, from the third element to the 2Nth+1 element, repeat the pattern of the first two elements. During operation of the above embodiment of optical switch of this invention, a desired output is obtained by selectively deviating the input beams and the transmitted beams at each section.

While in the above described embodiments 100, 200 of the optical switch of this invention the number of sections is even, embodiments are possible with an odd number of sections. In an embodiment with an odd number of sections, the last section is considered as an incomplete repeat of sections above the last section. That is, the last section is considered as the first section in another set of two groups of multiple sections, as in the generalized embodiment of the optical switch 100 of FIGS. 2(*a–f*); or, the last section is considered as first section in group of two sections, as in the generalized embodiment of the optical switch 200 of FIGS. 3(*a–f*). Succeeding elements repeat the pattern as described above. If N is the odd number of sections, where N is greater than one, then the generalized embodiment has N+1 directing elements.

Figure 5:
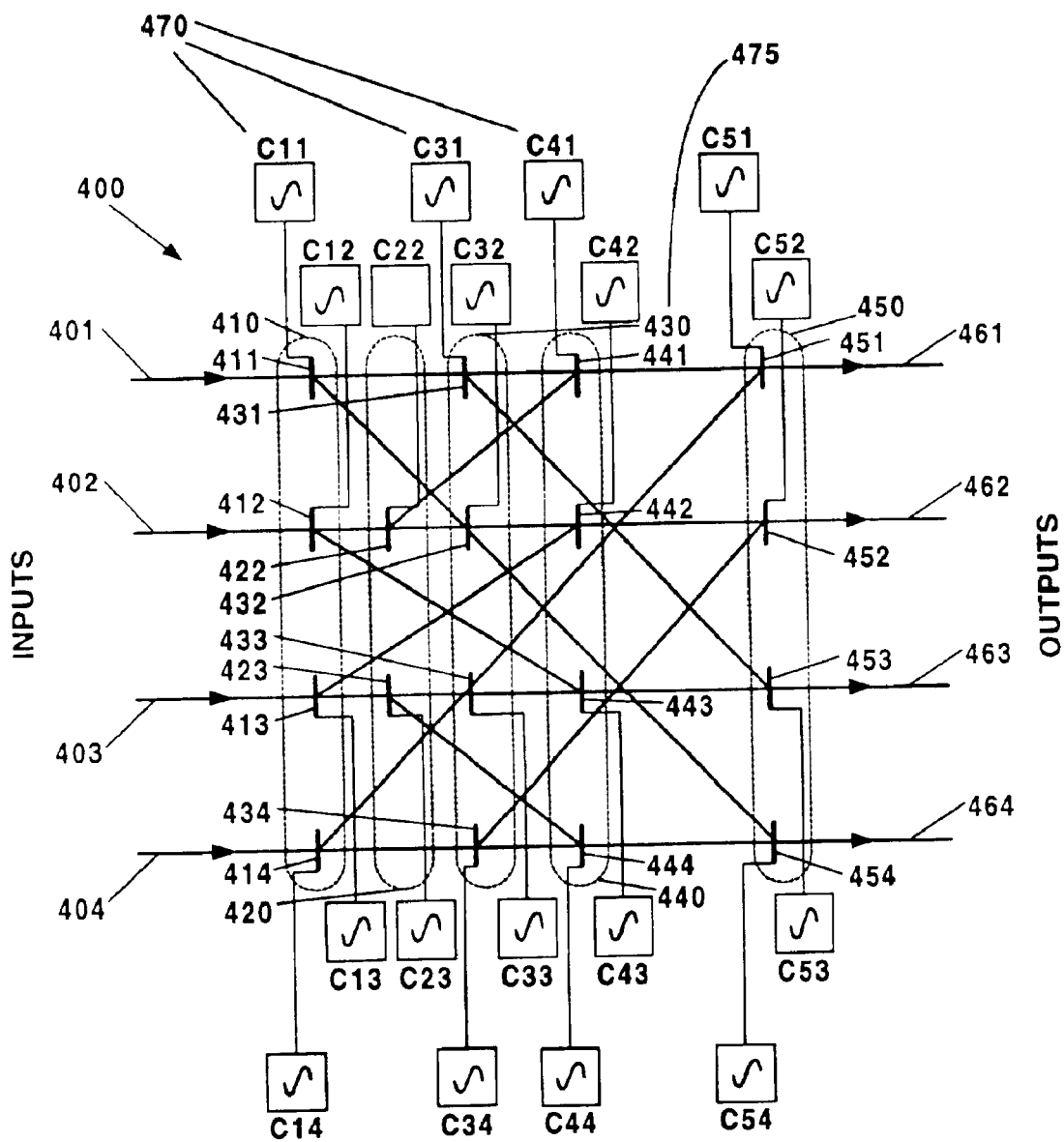
FIG. 5 depicts a graphical schematic representation of yet another embodiment of a 4×4 optical switch of this invention.

Yet another embodiment of the multiple input optical switch of this invention is shown in FIG. 5. In the embodiment 400 of the multiple input optical switch of this invention shown in FIG. 5 switching is controlled by the application of voltages from voltage sources 470, such as voltage source C11, to switchable diffraction gratings 411, 412, 422, 431, 432, 441, 442, 451, 452, 413, 414, 423, 433, 434, 443, 444, 453, 454. In the embodiment 400 of the multiple input optical switch of this invention shown in FIG. 5 each directing element includes two groups of sections. In each group, each section includes a switchable grating (deviating element) capable of deviating an incident beam in a direction corresponding to the same blazing state for each grating. Selected switchable elements are disabled (or, equivalently, absent).

Referring to FIG. 5, two input beams 401, 402 are received by the upper group, the two upper sections of the first directing element 410 and two other input beams 403, 404 are received by the lower group, the two lower sections, of the first directing element 410. Referring again to FIG. 5, the switchable grating in each of the two upper sections 411, 412 of the first directing element 410 is capable of deviating the corresponding input beam 401, 402 in the first direction. The switchable grating in each of the two lower sections 413, 414 of the first directing element 410 is capable of deviating the corresponding input beam 403, 404 in the second direction.

Also referring to FIG. 5, the switchable grating in the upper section 422 of the second directing element 420 is capable of deviating one of the beams transmitted through the first directing element 410 in the second direction. The switchable grating in the lower section 423 of the second directing element 420 is capable of deviating another one of the beams transmitted through the first directing element 410 in the first direction.

The pattern of the first two elements 410, 420 repeats in succeeding directing elements, from the third directing element 430 to the 5th directing element 450. That is, the switchable grating in each of the two upper sections of the third directing element 430 is capable of deviating one of the beams transmitted through a preceding directing element in the first direction and the switchable grating in each of the two lower sections of the third directing element 430 is capable of deviating another one of the beams transmitted through the preceding directing element in the second direction. The switchable grating in each of the two upper sections of the fourth directing element 440 is capable of deviating one of the beams transmitted through the preceding directing element in the second direction and the switchable grating in each of the two lower sections of the fourth directing element 440 is capable of deviating another one of the beams transmitted through the preceding directing element in the first direction. The pattern repeats in the fifth directing element 450. The switchable grating in each of the two upper sections 451, 452 of the fifth directing element 450 is capable of deviating one of the beams transmitted through a preceding directing element in the first direction and the switchable grating in each of the two lower sections 453, 454 of the fifth directing element 450 is capable of deviating another one of the beams transmitted through the preceding directing element in the second direction. Any input can be routed to any output by applying the correct logic to the switchable diffraction gratings. An embodiment of this logic, but not limited to, is shown in the Table 1, where a "0" represents the state where the grating is "cleared" or non-diffracting, a "1" represents the state where the grating is diffracting, and a "–" represents the case where the state of the grating has no effect on that particular switch state.

The optical switch 400 of this invention shown in FIG. 5 includes a free space propagation region 475. The free space propagation region 475 receives the preceding element transmitted beams. The preceding element transmitted beams propagate through the free space propagation region 475 and the propagated beams provide the input to the fifth directing element 450, which is the output directing element.

Although the optical switch 400 of this invention shown in FIG. 5 is shown in a specific embodiment, it should be noted that other embodiments are possible and this invention is not limited to that embodiment.

The above embodiment can be generalized to a 2N input beam switch, N being a positive integer greater than one. The generalized embodiment of the above described optical switch 400 of this invention has 2N+1 directing elements. In the generalized embodiment, the first directing element includes two groups of N sections. Each section in the first group of the first directing element receives one input beam and has a switchable grating capable of deviating the input beam in the first direction. Each section in each second group also receives one input beam and has a switchable grating capable of deviating the corresponding input beam in the second direction.

The second directing element in the generalized embodiment also includes two groups of N sections. Each section in the first group of the second directing element receives one of the 2N first element transmitted beams and also has a switchable grating capable of deviating the transmitted beam in the second direction. Each section in the second group of the second directing element receives another beam from the 2N first element transmitted beams and has a switchable grating capable of deviating the another transmitted beam in the first direction. The succeeding elements, from the third element to the 2Nth+1 element, repeat the pattern of the first two elements. During operation of the above embodiment of optical switch of this invention, a desired output is obtained by selectively deviating the input beams and the transmitted beams at each section.

Figure 6:
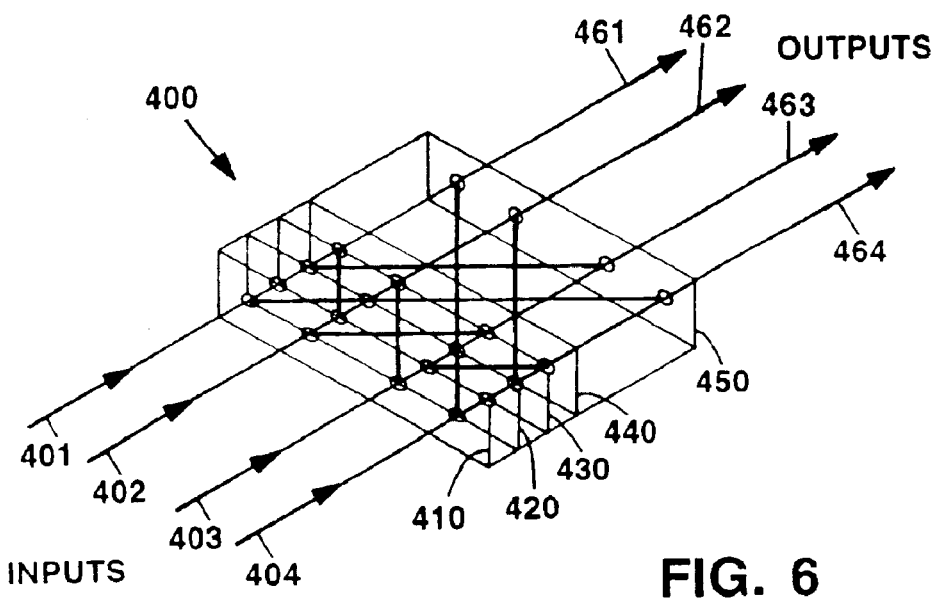
FIG. 6 depicts a graphical schematic three-dimensional representation of the embodiment shown in FIG. 4.
Figure 7:
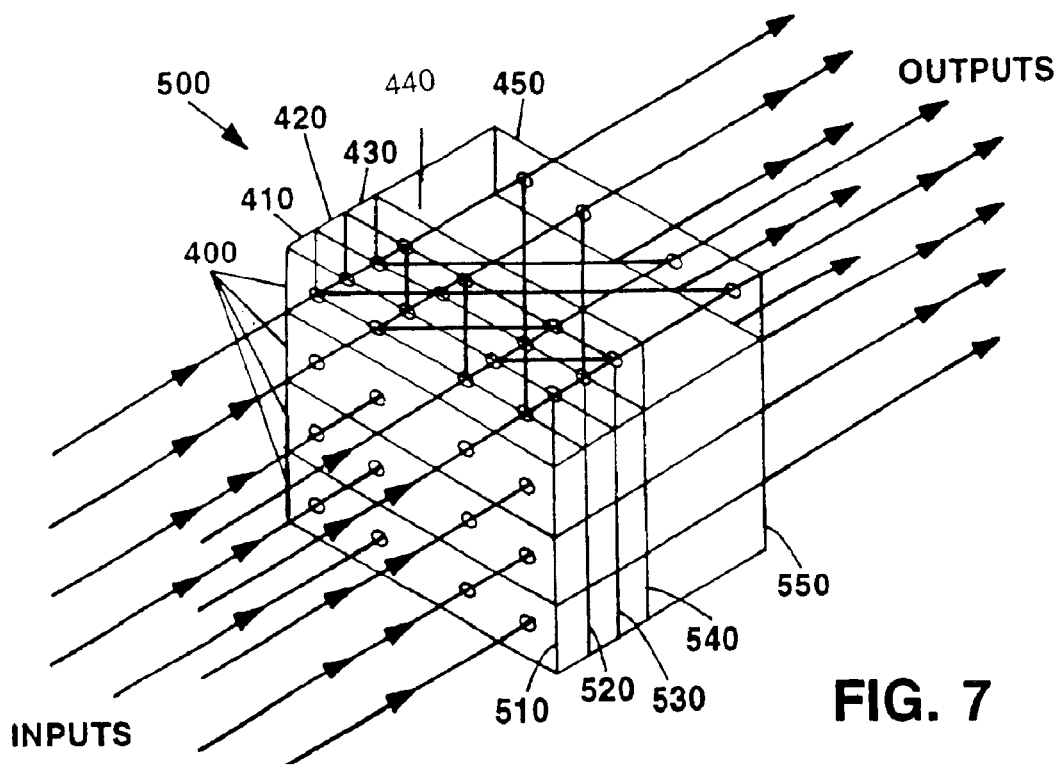
FIG. 7 depicts a graphical schematic representation of an embodiment of a multiple switch of this invention.

An isometric view of the above described embodiment of the 4×4 optical switch 400 of this invention is shown in FIG. 6. A multiple layer embodiment of the optical switch 500 of this invention is shown in FIG. 7. A first lower directing element 510 is disposed below said first directing element 410. Successive lower directing elements 520, 530, 540, 550 are disposed below the corresponding upper directing element 420, 430, 440, 450. In such a manner a replica of the 4×4 embodiment of the optical switch 400 of this invention is disposed below the upper 4×4 embodiment of the optical switch 400. Similarly, several other replicas of the 4×4 embodiment of the optical switch 400 of this invention can be stacked to obtain the multiple layer embodiment of the optical switch 500 of this invention shown in FIG. 7.

along the input and output beams. In the embodiment 600 of a switch device of this invention shown in FIG. 8, any of the input beams from any layer can be routed to any of the output beams from any other layer without any combination being blocked by another.

Figure 8:
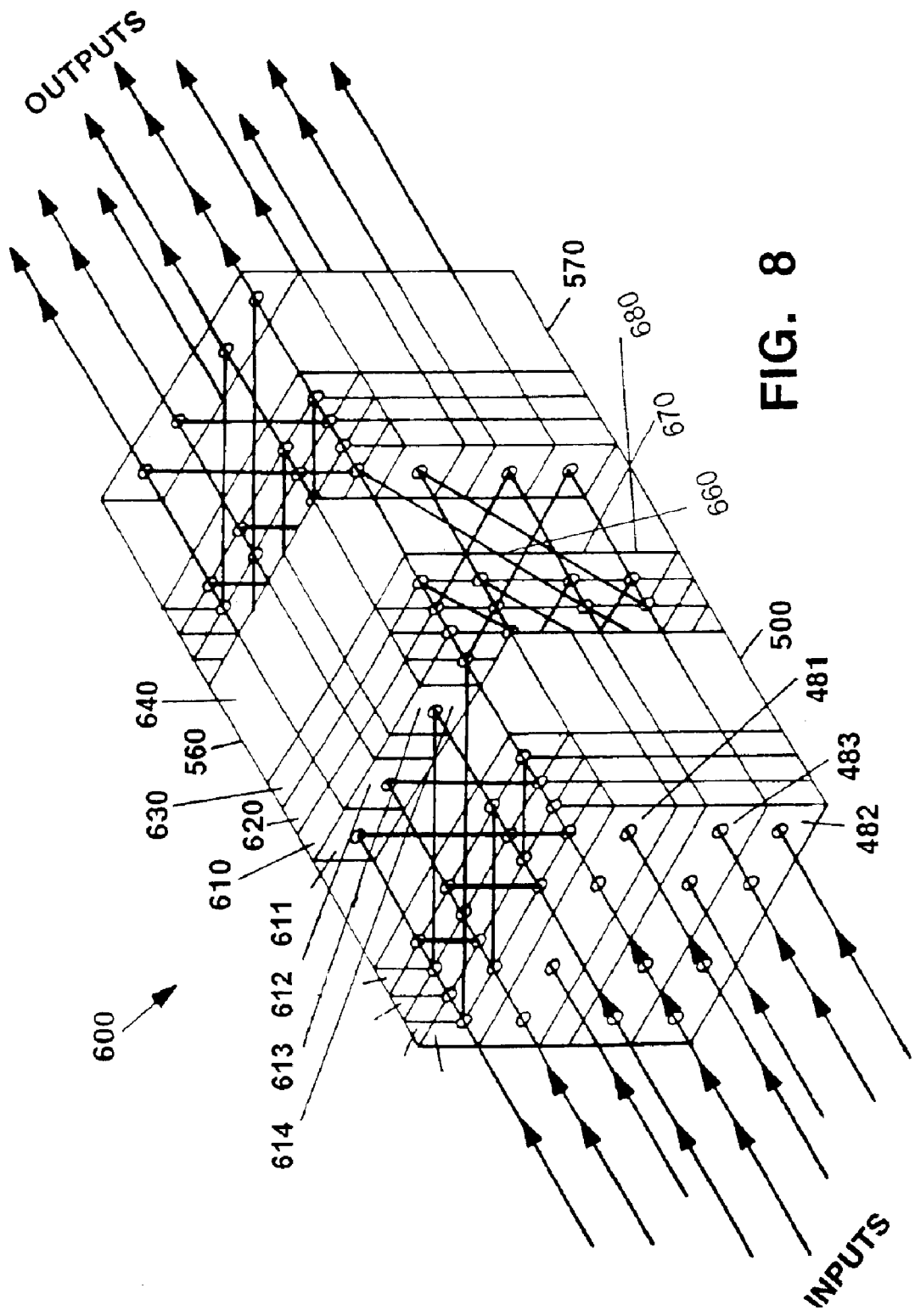
FIG. 8 is a graphical schematic representation of an embodiment of a three-dimensional switch of this invention.

In the multiple layer embodiment of the optical switch 600 of this invention shown in FIG. 8 any of the input beams from any layer can be routed to any of the output beams from any other layer without any combination being blocked by another. In the multiple layer embodiment of the optical switch 600 of this invention shown in FIG. 8, an upper cross shifting element 610 is optically disposed to receive the transmitted beams from the upper 4×4 embodiment of the optical switch 400. The upper cross shifting element 610 that

TABLE 1

| | | Output | | | | | Output | | | | | Output | | | |
|---|---|---|---|---|---|---|---|---|---|---|---|---|---|---|---|
| 411 | | 461 | 462 | 463 | 464 | 412 | | 461 | 462 | 463 | 464 | 413 | | 461 | 462 | 463 | 464 |
| Input | 401 | 0 | 1 | 0 | 1 | Input | 401 | — | — | — | — | Input | 401 | — | — | — | — |
| | 402 | — | — | — | — | | 402 | 0 | 0 | 1 | 0 | | 402 | — | — | — | — |
| | 403 | — | — | — | — | | 403 | — | — | — | — | | 403 | 0 | 1 | 0 | 0 |
| | 404 | — | — | — | — | | 404 | — | — | — | — | | 404 | — | — | — | — |

| | | Output | | | | | Output | | | | | Output | | | |
|---|---|---|---|---|---|---|---|---|---|---|---|---|---|---|---|
| 414 | | 461 | 462 | 463 | 464 | 422 | | 461 | 462 | 463 | 464 | 423 | | 461 | 462 | 463 | 464 |
| Input | 401 | — | — | — | — | Input | 401 | — | — | — | — | Input | 401 | — | — | — | — |
| | 402 | — | — | — | — | | 402 | 1 | 0 | — | 0 | | 402 | — | — | — | — |
| | 403 | — | — | — | — | | 403 | — | — | — | — | | 403 | 0 | — | 0 | 1 |
| | 404 | 1 | 0 | 1 | 0 | | 404 | — | — | — | — | | 404 | — | — | — | — |

| | | Output | | | | | Output | | | | | Output | | | |
|---|---|---|---|---|---|---|---|---|---|---|---|---|---|---|---|
| 431 | | 461 | 462 | 463 | 464 | 432 | | 461 | 462 | 463 | 464 | 433 | | 461 | 462 | 463 | 464 |
| Input | 401 | 0 | — | 1 | — | Input | 401 | — | 1 | — | 0 | Input | 401 | — | — | — | — |
| | 402 | — | — | — | — | | 402 | — | 0 | — | 1 | | 402 | — | — | — | — |
| | 403 | — | — | — | — | | 403 | — | — | — | — | | 403 | 1 | — | 0 | — |
| | 404 | — | — | — | — | | 404 | — | — | — | — | | 404 | 0 | — | 1 | — |

| | | Output | | | | | Output | | | | | Output | | | |
|---|---|---|---|---|---|---|---|---|---|---|---|---|---|---|---|
| 434 | | 461 | 462 | 463 | 464 | 441 | | 461 | 462 | 463 | 464 | 442 | | 461 | 462 | 463 | 464 |
| Input | 401 | — | — | — | — | Input | 401 | 0 | — | — | — | Input | 401 | — | 0 | — | — |
| | 402 | — | — | — | — | | 402 | 1 | — | — | — | | 402 | — | 0 | — | — |
| | 403 | — | — | — | — | | 403 | — | — | — | — | | 403 | — | 1 | — | — |
| | 404 | — | 1 | — | 0 | | 404 | — | — | — | — | | 404 | — | — | — | — |

| | | Output | | | | | Output | | | | | Output | | | |
|---|---|---|---|---|---|---|---|---|---|---|---|---|---|---|---|
| 443 | | 461 | 462 | 463 | 464 | 444 | | 461 | 462 | 463 | 464 | 451 | | 461 | 462 | 463 | 464 |
| Input | 401 | — | — | — | — | Input | 401 | — | — | — | — | Input | 401 | 0 | — | — | — |
| | 402 | — | — | 1 | — | | 402 | — | — | — | — | | 402 | 0 | — | — | — |
| | 403 | — | — | 0 | — | | 403 | — | — | — | 1 | | 403 | 1 | — | — | — |
| | 404 | — | — | 0 | — | | 404 | — | — | — | 0 | | 404 | 1 | — | — | — |

| | | Output | | | | | Output | | | | | Output | | | |
|---|---|---|---|---|---|---|---|---|---|---|---|---|---|---|---|
| 452 | | 461 | 462 | 463 | 464 | 453 | | 461 | 462 | 463 | 464 | 454 | | 461 | 462 | 463 | 464 |
| Input | 401 | — | 0 | — | — | Input | 401 | — | — | 1 | — | Input | 401 | — | — | — | 1 |
| | 402 | — | 0 | — | — | | 402 | — | — | 0 | — | | 402 | — | — | — | 1 |
| | 403 | — | 0 | — | — | | 403 | — | — | 0 | — | | 403 | — | — | — | 0 |
| | 404 | — | 1 | — | — | | 404 | — | — | 0 | — | | 404 | — | — | — | 0 |

Shown in FIG. 8 is an embodiment 600 of a switch device of this invention obtained by concatenating in series three of the multiple layer embodiments of the optical switch 500 of this invention shown in FIG. 7. The second device is rotated 90 degrees about the axis defined by the propagation of light is optically disposed to receive the transmitted beams from the upper 4×4 embodiment of the optical switch 400 includes four sections 611, 612, 613, 614. Each of sections 611, 612, 613, 614 of the first upper cross shifting element 610 include a switchable deviating component (switchable grating) capable of deviating in an upper cross shifting direction one of the previous element transmitted beams. In the embodiment shown in FIG. 8, all the sections 611, 612, 613, 614 of the first upper cross shifting element 610 are capable of deviating in an upper cross shifting direction one of the previous element transmitted beams. The upper cross shifting direction has a component directed towards the lower directing elements (that is, a component perpendicular to the plane containing the beams for upper 4×4 embodiment of the optical switch 400 and the previous element transmitted beams). Three lower cross shifting elements 660, 670, 680 are disposed below the first upper cross shifting element 610. Each lower cross shifting element 660, 670, 680 is disposed below the previous lower cross shifting element 660, 670, 680. Each lower cross shifting element 660, 670, 680 is optically disposed to receive the transmitted beams from each replica of the 4×4 embodiment of the optical switch of this invention 481, 482, 483, which are disposed below the upper 4×4 embodiment of the optical switch 400. Each lower cross shifting element 660, 670, 680 includes four sections and each section has a switchable deviating component (switchable grating) capable of deviating in a cross shifting direction one of the transmitted beams from the corresponding replica of the 4×4 embodiment of the optical switch 481, 482, 483. All the sections of the first lower cross shifting element 660 are capable of deviating one of the corresponding transmitted beams in a manner similar to that of the upper cross shifting element 610. In the embodiment shown in FIG. 8, all the sections of the second lower cross shifting element 670 are capable of deviating in an second lower cross shifting direction one of the transmitted beams from the corresponding replica of the 4×4 embodiment of the optical switch 482. The second lower cross shifting direction has a component directed towards the upper directing elements. All the sections of the third lower cross shifting element 680 are capable of deviating one of the corresponding transmitted beams in a manner similar to that of the second lower cross shifting element 670.

Subsequent upper cross shifting elements 620, 630, 640, 650 and corresponding lower cross shifting elements (not shown) comprise a three dimensional switching device 560. This three dimensional switching device 560 is similar to the optical switch 500 shown in FIG. 6 but it is rotated 90 degrees about the axis defined by the propagation of light along the input and output beams of the optical switching device 600 shown in FIG. 8. In the optical switching device 600 shown in FIG. 8, any of the input beams from any layer can be routed to any of the output beams from any other layer without any combination being blocked by another.

Figure 9:
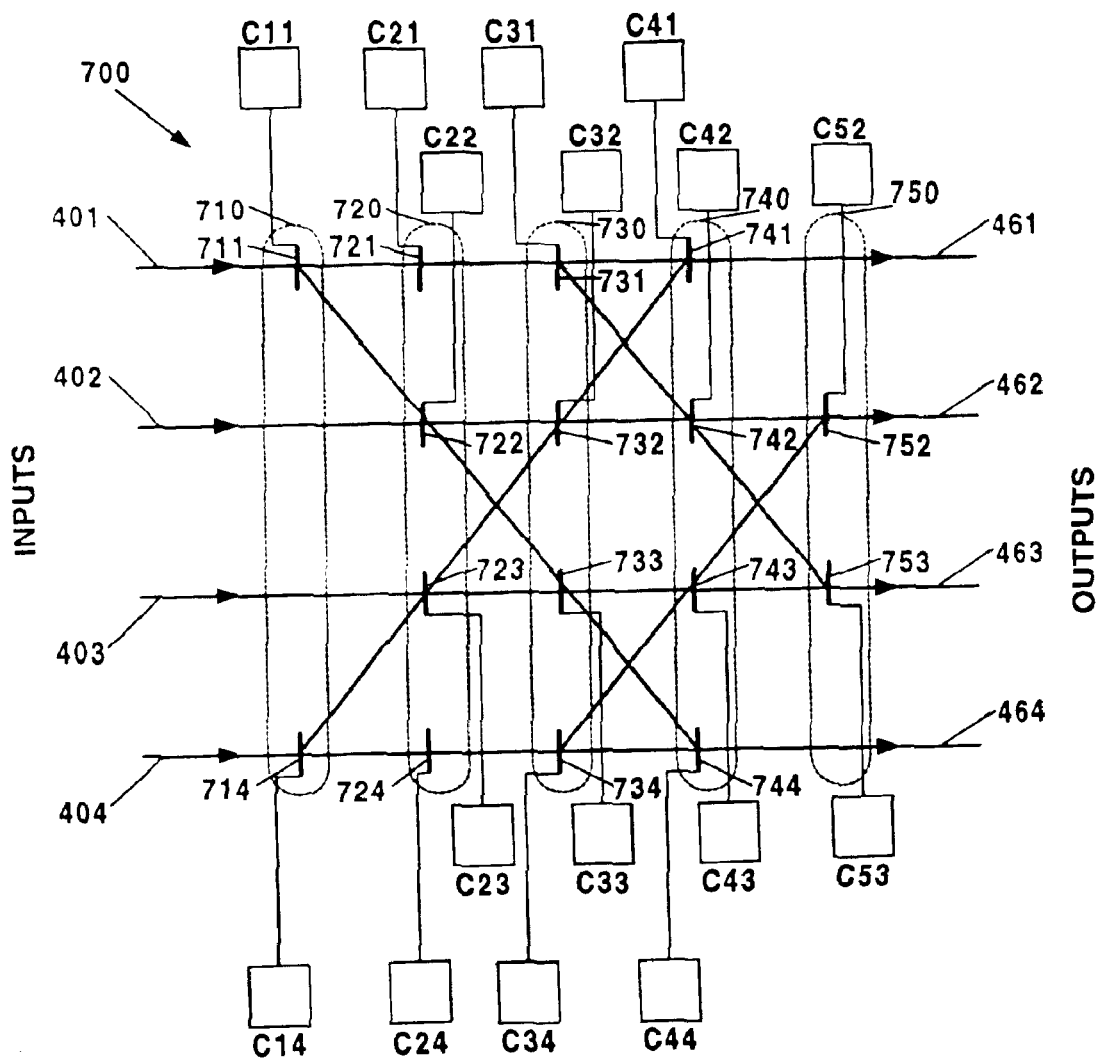
FIG. 9 depicts a graphical schematic representation of a further embodiment of a 4×4 optical switch of this invention.

A further embodiment 700 of the multiple input optical switch of this invention is shown in FIG. 9. In the embodiment 700 of the multiple input optical switch of this invention shown in FIG. 9, switching is controlled by the application of voltages from voltage sources 470, such as voltage source C11, to switchable diffraction gratings 711, 714, 721, 722, 723, 724, 731, 732, 733, 734, 741, 742, 743, 744, 752, 753. In the embodiment 700 of the multiple input optical switch of this invention shown in FIG. 9 each directing element includes two groups of sections. In each group, each section includes a switchable grating (deviating element) having the same blazing state capable of deviating an incident beam in a direction consistent with the same blazing state. Hereinafter, a direction consistent with a first blazing is referred to as a first direction, and so forth. Selected switchable elements are disabled (or, equivalently, absent).

Referring to FIG. 9, the first directing element 710 receives two input beams 401, 402 at the first group of sections. The first section in the first group has a switchable volume grating 711 capable of deviating the first input beam 401 in the first direction. The second group of sections in the first directing element 710 receives two input beams 403, 404. The second group of two sections is similar to the first group of two sections. The second section in the second group has a switchable grating 714 capable of deviating the corresponding input beam 404 in the second direction.

Referring again to FIG. 9, the first group of two sections (including two switchable gratings 721, 722) of the second directing element 720 receives two of the four first element transmitted beams. The second section in the first group has a switchable grating 722 capable of deviating another one of the four first element transmitted beams in the first direction. The second group of two sections (including two switchable gratings 723, 724) in the second directing element 720 receives another two of the four first element transmitted beams. The second group of two sections (including two switchable gratings 723, 724) is similar to the first group of two sections (including two switchable gratings 721, 722). The first section in the second group has a switchable grating 723 capable of deviating the corresponding first element transmitted beam in the second direction.

The pattern of the first two elements 710, 720 repeats in succeeding directing elements, from the third directing element 730 to the fifth directing element 750. That is, the third directing element 730 includes two groups of sections. In each group of section of the third directing element 730, the first section in each group has a switchable grating 731, 733 capable of deviating the corresponding second element transmitted beam in the first direction. The second section in each group has a switchable grating 732, 734 capable of deviating the corresponding second element transmitted beam in the second direction. The fourth directing element 740 also includes two groups of sections. In each group of section of the fourth directing element 740, the first section in each group has a switchable grating 741, 743 capable of deviating the corresponding third element transmitted beam in the second direction. The second section in each group of the fourth directing element has a switchable grating 742, 744 capable of deviating the corresponding third element transmitted beam in the first direction. The fifth directing element is similar to the first and third directing elements. That is, the fifth directing element 750 also includes two groups of sections and the first section in each group has a switchable grating 753 capable of deviating the corresponding fourth element transmitted beam in the first direction. The second section in each group from the fifth directing element 750 has a switchable grating 752 capable of deviating the corresponding fourth element transmitted beam in the second direction. Any input can be routed to any output by applying the correct logic to the switchable diffraction gratings. An embodiment of this logic, but not limited to, is shown in the Table 2, where a "0" represents the state where the grating is "cleared" or non-diffracting, a "1" represents the state where the grating is diffracting, and a "–" represents the case where the state of the grating has no effect on that particular switch state.

TABLE 2

| | | Output | | | | | Output | | | | | Output | | | |
|---|---|---|---|---|---|---|---|---|---|---|---|---|---|---|---|
| 711 | | 461 | 462 | 463 | 464 | 714 | 461 | 462 | 463 | 464 | 721 | 461 | 462 | 463 | 464 |
| Input | 401 | 0 | 0 | 0 | 1 | Input 401 | — | — | — | — | Input 401 | 0 | 0 | 0 | — |
| | 402 | — | — | — | — | 402 | — | — | — | — | 402 | — | — | — | — |
| | 403 | — | — | — | — | 403 | — | — | — | — | 403 | — | — | — | — |
| | 404 | — | — | — | — | 404 | 1 | 0 | 0 | 0 | 404 | — | — | — | — |

| | | Output | | | | | Output | | | | | Output | | | |
|---|---|---|---|---|---|---|---|---|---|---|---|---|---|---|---|
| 722 | | 461 | 462 | 463 | 464 | 723 | 461 | 462 | 463 | 464 | 724 | 461 | 462 | 463 | 464 |
| Input | 401 | — | — | — | 0 | Input 401 | — | — | — | — | Input 401 | — | — | — | — |
| | 402 | 0 | 0 | 0 | 1 | 402 | — | — | — | — | 402 | — | — | — | — |
| | 403 | — | — | — | — | 403 | 1 | 0 | 0 | 0 | 403 | — | — | — | — |
| | 404 | — | — | — | — | 404 | 0 | — | — | — | 404 | — | 0 | 0 | 0 |

| | | Output | | | | | Output | | | | | Output | | | |
|---|---|---|---|---|---|---|---|---|---|---|---|---|---|---|---|
| 731 | | 461 | 462 | 463 | 464 | 732 | 461 | 462 | 463 | 464 | 733 | 461 | 462 | 463 | 464 |
| Input | 401 | 0 | 1 | 1 | — | Input 401 | — | — | — | — | Input 401 | — | — | — | 0 |
| | 402 | — | — | — | — | 402 | 1 | 0 | 0 | — | 402 | — | — | — | 0 |
| | 403 | — | — | — | — | 403 | 0 | — | — | — | 403 | — | 0 | 0 | 1 |
| | 404 | — | — | — | — | 404 | 0 | — | — | — | 404 | — | — | — | — |

| | | Output | | | | | Output | | | | | Output | | | |
|---|---|---|---|---|---|---|---|---|---|---|---|---|---|---|---|
| 734 | | 461 | 462 | 463 | 464 | 741 | 461 | 462 | 463 | 464 | 742 | 461 | 462 | 463 | 464 |
| Input | 401 | — | — | — | — | Input 401 | 0 | — | — | — | Input 401 | — | 1 | 0 | — |
| | 402 | — | — | — | — | 402 | 1 | — | — | — | 402 | — | 0 | 1 | — |
| | 403 | — | — | — | — | 403 | 1 | — | — | — | 403 | — | — | — | — |
| | 404 | — | 1 | 1 | 0 | 404 | 1 | — | — | — | 404 | — | — | — | — |

| | | Output | | | | | Output | | | | | Output | | | |
|---|---|---|---|---|---|---|---|---|---|---|---|---|---|---|---|
| 743 | | 461 | 462 | 463 | 464 | 744 | 461 | 462 | 463 | 464 | 752 | 461 | 462 | 463 | 464 |
| Input | 401 | — | — | — | — | Input 401 | — | — | — | 1 | Input 401 | — | 0 | — | — |
| | 402 | — | — | — | — | 402 | — | — | — | 1 | 402 | — | 0 | — | — |
| | 403 | — | 1 | 0 | — | 403 | — | — | — | 1 | 403 | — | 1 | — | — |
| | 404 | — | 0 | 1 | — | 404 | — | — | — | 0 | 404 | — | 1 | — | — |

| | | Output | | | |
|---|---|---|---|---|---|
| | 753 | 461 | 462 | 463 | 464 |
| Input | 401 | — | — | 1 | — |
| | 402 | — | — | 1 | — |
| | 403 | — | — | 0 | — |
| | 404 | — | — | 0 | — |

Although the optical switch 700 of this invention shown in FIG. 9 is shown in a specific embodiment, it should be noted that other embodiments are possible and this invention is not limited to that embodiment.

The above embodiment can be generalized to a 2N input beam switch, N being a positive integer greater than zero. The generalized embodiment of the above described optical switch 700 of this invention has 2N+1 directing elements. In the generalized embodiment, the first directing element includes N groups of sections, each group from the N groups including two sections. The first section in each group of the first directing element receives one input beam and has a switchable grating capable of deviating the input beam in the first direction. The second section in each group receives another input beam and has a switchable grating capable of deviating the another input beam in the second direction.

The second directing element in the generalized embodiment of the above described optical switch 700 of this invention also includes N groups of sections, each group from the N groups also including two sections. The first section in each group of the second directing element receives one of the 2N first directing element transmitted beams and also has a switchable grating capable of deviating the transmitted beam in the second direction. The second section in each group of the second directing element receives another beam from the 2N first directing element transmitted beams and has a switchable grating capable of deviating the another transmitted beam in the first direction. The succeeding elements, from the third element to the 2Nth+1 element, repeat the pattern of the first two elements. During operation of the above embodiment of optical switch of this invention, a desired output is obtained by selectively deviating the input beams and the transmitted beams at each section.

While in the above described embodiments 400 and 700 of the optical switch of this invention the number of sections is even, embodiments are possible with an odd number of sections. In an embodiment with an odd number of sections, the last section is considered as an incomplete repeat of sections above the last section. That is, the last section is considered as the first section in another set of two groups of multiple sections, as in the generalized embodiment of the optical switch 400 of FIG. 5; or, the last section is considered as first section in group of two sections, as in the generalized embodiment of the optical switch 700 of FIG. 9. Succeeding elements repeat the pattern as described above. If N is the odd number of sections, where N is greater than one, then the generalized embodiment has N+1 directing elements.

Figure 10:
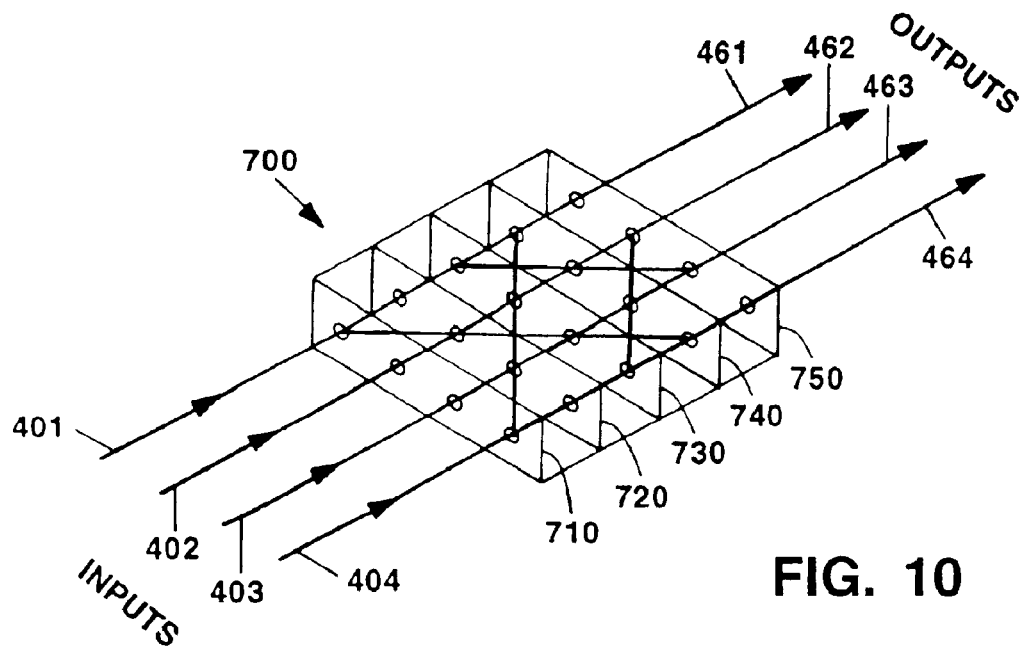
FIG. 10 depicts a graphical schematic three-dimensional representation of the embodiment shown in FIG. 8.
Figure 11:
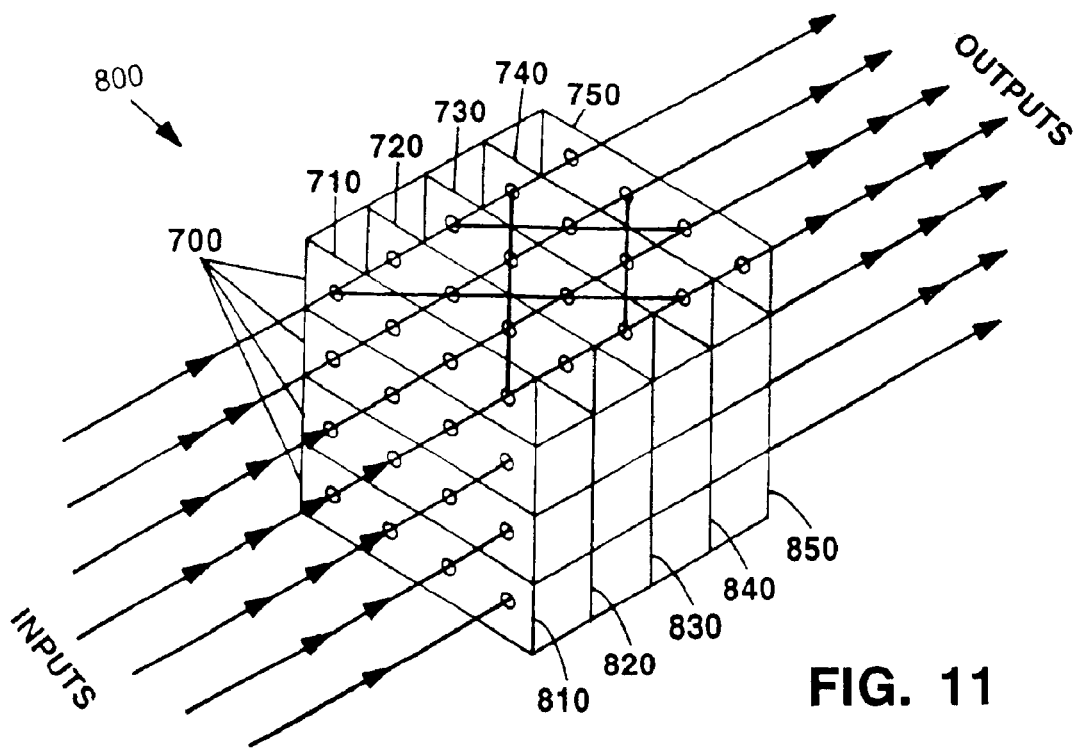
FIG. 11 depicts a graphical schematic representation of another embodiment of a multiple switch of this invention; and, FIG. 12 represents a graphical schematic representation of another embodiment of a three-dimensional switch of this invention.

An isometric view of the above described 4×4 embodiment 700 of the optical switch of this invention is shown in FIG. 10. A multiple layer embodiment 800 of the optical switch of this invention is shown in FIG. 11. A first lower directing element 810 is disposed below said first directing element 710. Successive lower directing elements 820, 830, 840, 850 are disposed below the corresponding upper directing element 720, 730, 740, 750. In such a manner a replica of the 4×4 embodiment of the optical switch 700 of this invention is disposed below the upper 4×4 embodiment of the optical switch 700. Similarly, several other replicas of the 4×4 embodiment of the optical switch 700 of this invention can be stacked to obtain the multiple layer embodiment of the optical switch 800 of this invention shown in FIG. 11.

Figure 12:
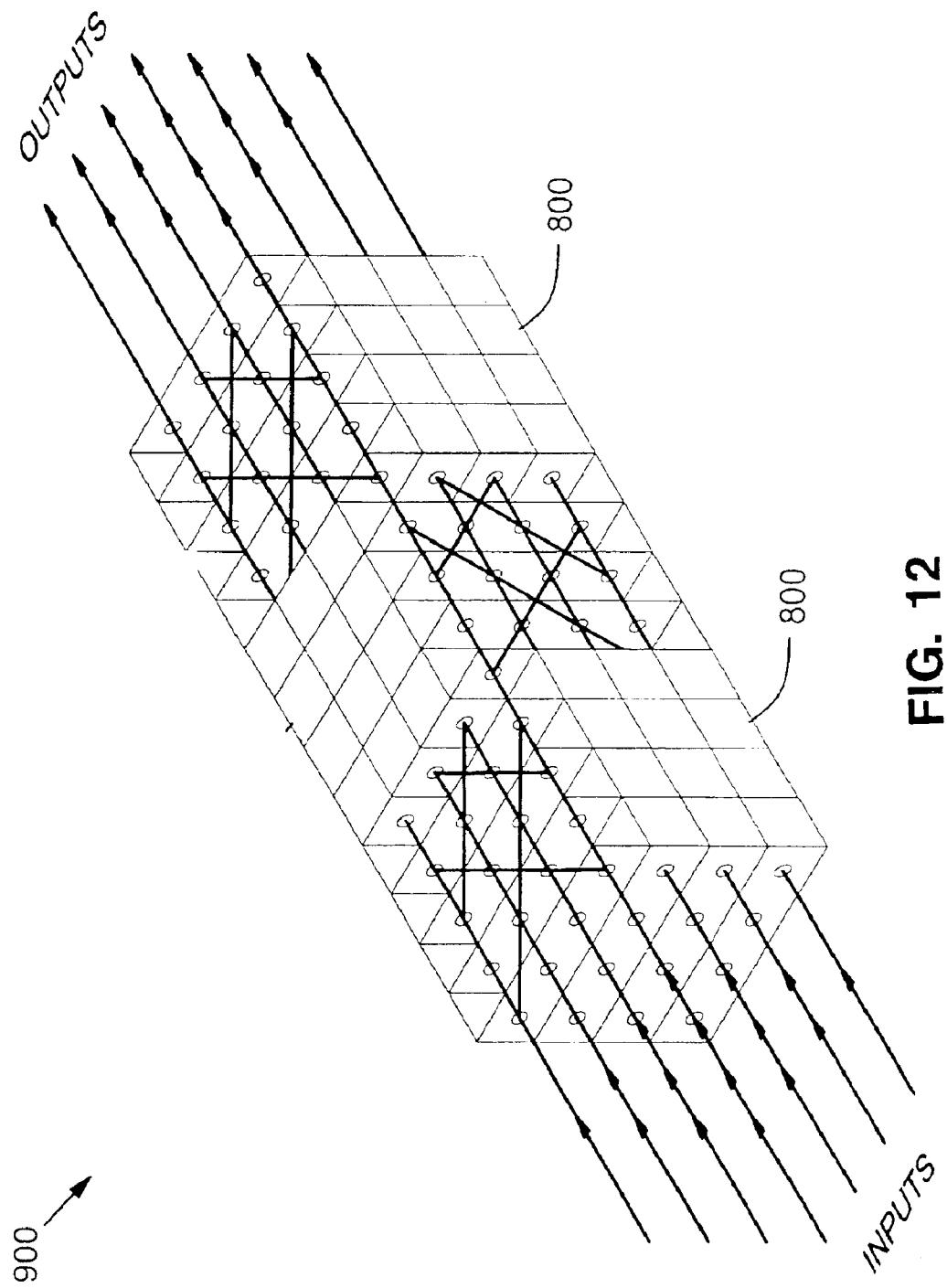

Shown in FIG. 12 is an embodiment 900 of a switch device of this invention obtained by concatenating in series three of the multiple layer embodiments of the optical switch 800 of this invention shown in FIG. 11. The second device is rotated 90 degrees about the axis defined by the propagation of light along the input and output beams. In the embodiment 900 of a switch device of this invention shown in FIG. 11, any of the input beams from any layer can be routed to any of the output beams from any other layer without any combination being blocked by another.

It should be noted that although the above described embodiments of optical switches depicted switching of the switchable deviating component by electrical means, this is not a limitation of this invention and switching based on other mechanisms including, but not limited to, optical switching, polarization switching is also possible.

It should be noted that although the invention has been described in terms of switchable gratings other deviating mechanisms are also within the scope of this invention. Other embodiments, but not limited to, of switchable blazed gratings could be used as deviating elements.

Although the invention has been described with respect to various embodiments, it should be realized this invention is also capable of a wide variety of further and other embodiments within the spirit and scope of the appended claims.

What is claimed is:

1. An optical switch comprising:
   at least two directing elements,
      a first directing element including at least two sections,
         a first section of said first directing element capable of receiving and transmitting a first section input beam,
            said first section also being capable of controllably deviating said first section input beam in a first direction, and,
         a second section of said first directing element capable of receiving and transmitting a second section input beam,
            said second section also being capable of the controllably deviating said second section input beam in a second direction; and,
      a second directing element including at least two sections a first section of said second directing element capable of receiving and transmitting a second element first section incident beam, said second directing element first section incident beam being one of the first directing element transmitted beams,
      said first section of the second directing element also being capable of controllably deviating in a second directing element first direction said second directing element first section incident beam, and,
   a second section of said second directing element capable of receiving and transmitting a second directing element second section incident beam, said second directing element second section incident beam being another one of the first directing element transmitted beams, said second section of the second directing element also being capable of deviating in a second directing element second direction said second directing element second section incident beam;
   the first section input beam, the second section input beam, the at least two first element transmitted beams, and at least second two second element transmitted beams being substantially in a same plane,
   wherein each one of said at least two sections of each one said at least two directing elements includes a switchable volume grating, said first direction corresponding to a blazing state of a first section first directing element switchable volume grating, said second direction corresponding to a blazing state of a second section directing element switchable volume grating, said second directing element first direction corresponding to a blazing state of a first section second directing element switchable volume grating, said second directing element second direction corresponding to a blazing state of a second section second directing element switchable volume grating.

2. The optical switch of claim 1, further comprising:
   a free space propagation region capable of receiving and transmitting at least two free space propagation region incident beams, the at least two free space propagation region incident beams being at least two preceding element transmitted beams;
   an output directing element including at least two sections, a first section of said output directing element capable of receiving and transmitting an output directing element first section incident beam, said output directing element first section incident beam being one of the free space region transmitted beams, said first section of the output directing element also being capable of controllably deviating in an output directing element first direction said output directing element first section incident beam, and,
   a second section of said output directing element capable of receiving an output directing element second section incident beam, said output directing element second section incident beam being another one of the free space region transmitted beams, said second section of the second directing element also being capable of controllably deviating in an output directing element second direction said output directing element second section incident beam; the at least two free space region transmitted beams, at least two output directing element transmitted beams, the first section input beam, the second section input beam, the at least two first element transmitted beams, and the at least two preceding element transmitted beams being substantially in the same plane.

3. The optical switch of claim 1, further comprising:
at least two displaced directing elements adjacent to and in a stack relationship with respect to said at least two directing elements,
   a first displaced directing element, adjacent to and in a stack relationship with respect to said first directing element, the first displaced directing element including at least two sections,
      a first displaced section of said first displaced directing element capable of receiving and transmitting a first displaced section input beam,
         said first displaced section of the first displaced directing element also being capable of controllably deviating said first displaced section input beam in the first direction, and,
      a second displaced section of said first displaced directing element capable of receiving and transmitting a second displaced section input beam,
         said second displaced section of the first displaced directing element also being capable of controllably deviating in the second direction said second displaced section input beam; and,
   a second displaced directing element, adjacent to and in a stack relationship with respect to said second directing element, including at least two sections,
      a first section of said second displaced directing element capable of receiving and transmitting a second displaced directing element first section incident beam, said second displaced directing element first section incident beam being one of the first displaced directing element transmitted beams, said first section of the second displaced directing element also being capable of controllably deviating said second displaced directing element first section incident beam in a second displaced directing element first direction, and,
      a second section of said second displaced directing element capable of receiving and transmitting a second displaced directing element second section incident beam, said second displaced directing element second section incident beam being another one of the first displaced element transmitted beams, said second section of the second displaced directing element also being capable of deviating said second displaced directing element second section incident beam in a second displaced directing element second direction;
   the first displaced section input beam, the second displaced section input beam, the at least two first displaced directing element transmitted beams, and at least second two second displaced directing element transmitted beams being substantially in a same displaced plane, the same displaced plane being adjacent to, in a stack relationship with respect to and substantially parallel to the plane containing the first section input beam, the second section input beam, the at least two first element transmitted beams, and at least second two second element transmitted beams.

4. The optical switch of claim 3 further comprising:
at least one upper cross shifting element optically disposed to receive previous element transmitted beams, the upper cross shifting element including at least two sections,
   (1) a first upper cross shifting section capable of receiving and transmitting one of the previous element transmitted beams,
      said first upper cross shifting section also being capable of controllably deviating one of the previous element transmitted beams in a first upper cross shifting direction,
      the first upper cross shifting direction having a component perpendicular to the plane containing the first section input beam, the second section input beam, the at least two first element transmitted beams, and at least two previous element transmitted beams, and,
   a second upper cross shifting section capable of receiving and transmitting another one of the previous element transmitted beams,
      said second upper cross shifting section also being capable of the deviating said another one of the previous element transmitted beams in a second upper cross shifting direction,
      the second upper cross shifting direction having a component perpendicular to the plane containing the first section input beam, the second section input beam, the at least two first element transmitted beams, and the previous element transmitted beams; and,
at least one displaced cross shifting element optically disposed to receive previous displaced directing element transmitted beams, the displaced cross shifting element including at least two sections,
   a first displaced cross shifting section capable of receiving and transmitting one of the previous displaced directing element transmitted beams, said first displaced cross shifting section also being capable of controllably deviating in a first displaced cross shifting direction said one of the previous displaced directing element transmitted beams, the displaced upper cross shifting direction having a component perpendicular to the displaced plane, and,
   a second displaced cross shifting section capable of receiving and transmitting another one of the previous element transmitted beams, said second upper cross shifting section also being capable of the deviating said another one of the previous displaced directing element transmitted beams in a second upper cross shifting direction, the second displaced cross shifting direction having a component perpendicular to the displaced plane.

5. An optical switch comprising:
at least two directing elements,
   a first directing element including at least two sections,
      a first section of said first directing element capable of receiving and transmitting a first section input beam,
         said first section also being capable of controllably deviating said first section input beam in a first direction, and,
      a second section of said first directing element capable of receiving and transmitting a second section input beam,
         said second section also being capable of the controllably deviating said second section input beam in a second direction; and,
   a second directing element including at least two sections
      a first section of said second directing element capable of receiving and transmitting a second element first section incident beam, said second directing element first section incident beam being one of the first directing element transmitted beams, said first section of the second directing element also being capable of controllably deviating in a second directing element first direction said second directing element first section incident beam, and, a second section of said second directing element capable of receiving and transmitting a second directing element second section incident beam, said second directing element second section incident beam being another one of the first directing element transmitted beams, said second section of the second directing element also being capable of deviating in a second directing element second direction said second directing element second section incident beam;

the first section input beam, the second section input beam, the at least two first element transmitted beams, and at least second two second element transmitted beams being substantially in a same plane, wherein the at least two sections comprise 2N sections, N being a positive integer greater than one; and, wherein the at least two directing elements comprise 2N+1 directing elements.

6. An optical switch comprising:

at least two directing elements, a first directing element including at least two sections,
a first section of said first directing element capable of receiving and transmitting a first section input beam,
said first section also being capable of controllably deviating said first section input beam in a first direction, and,
a second section of said first directing element capable of receiving and transmitting a second section input beam,
said second section also being capable of the controllably deviating said second section input beam in a second direction; and, a second directing element including at least two sections
a first section of said second directing element capable of receiving and transmitting a second element first section incident beam, said second directing element first section incident beam being one of the first directing element transmitted beams,
said first section of the second directing element also being capable of controllably deviating in a second directing element first direction said second directing element first section incident beam, and,
a second section of said second directing element capable of receiving and transmitting a second directing element second section incident beam, said second directing element second section incident beam being another one of the first directing element transmitted beams, said second section of the second directing element also being capable of deviating in a second directing element second direction said second directing element second section incident beam;

the first section input beam, the second section input beam, the at least two first element transmitted beams, and at least second two second element transmitted beams being substantially in a same plane, wherein the at least two sections comprise N sections, N being an odd positive integer greater than one; and, wherein the at least two directing elements comprise N+1 directing elements.

7. The optical switch of claim 1, wherein the second directing element first direction is the second direction and the second directing element second direction is the first direction.

8. The optical switch of claim 7, wherein the at least two sections comprise 2N sections, N being a positive integer greater than one; and, wherein the at least two directing elements comprise 2N+1 directing elements; and, wherein the first directing element includes N groups of sections, each group from the N groups including two sections,
a first section capable of receiving and transmitting an input beam from a plurality of input beams and also being capable of controllably deviating said input beam from the plurality of input beams in the first direction, and,
a second section capable of receiving and transmitting another input beam from the plurality of input beams and also being capable of controllably deviating said another input beam in the second direction; and, the second directing element includes N groups of sections, each group from the N groups including two sections,
a first section capable of receiving and transmitting a transmitted beam from a plurality of first element transmitted beams and also being capable of controllably deviating said transmitted beam from the plurality of first element transmitted beams in the second direction, and,
a second section capable of receiving and transmitting another transmitted beam from the plurality of first element transmitted beams and also being capable of controllably deviating said another transmitted beam in the first direction; and, wherein a group of succeeding elements, including the third element to the 2Nth+1 element, has a repeating pattern, the pattern comprising one element including N groups of sections,
each group from the N groups including two sections,
a first section capable of receiving and transmitting a preceding element transmitted beam from a plurality of preceding element transmitted beams and also being capable of controllably deviating said preceding element transmitted beam in the first direction, and, a second section capable of receiving and transmitting another preceding element transmitted beam from the plurality of preceding element transmitted beams and also being capable of controllably deviating said another preceding element transmitted beam in the second direction; and, a next element including N groups of sections,
each group from the N groups including two sections,
a first section capable of receiving and transmitting a preceding element transmitted beam from the plurality of preceding element transmitted beams and also being capable of controllably deviating said preceding element transmitted beam in the second direction, and,
a second section capable of receiving and transmitting another preceding element transmitted beam from the plurality of preceding element transmitted beams and also being capable of controllably deviating said another preceding element transmitted beam in the second direction.

9. The optical switch of claim 7, wherein the at least two sections comprise 2N sections, N being a positive integer greater than one; and, wherein the at least two directing elements comprise 2N+1 directing elements; and, wherein the first directing element includes two groups of sections, the first group including N first sections, each of the N first sections being capable of receiving an input beam from a plurality of input beams and also being capable of deviating said input beam in the first direction, and, the second group including N second sections, each of the N second sections being capable of receiving another input beam from the plurality of input beams and also being capable of deviating said another input beam in the second direction; and, wherein the second directing element includes two groups of sections, the first group including N first sections, each of the N first sections being capable of receiving a first element transmitted beam from a plurality of first element transmitted beams from a plurality of input beams and also being capable of deviating said first element transmitted beam in the second direction, and, the second group including N second sections, each of the N second sections being capable of receiving another first element transmitted beam from a plurality of first element transmitted beams and being capable of deviating said another first element transmitted beam in the first direction; and, wherein a group of succeeding elements, including the third element to the 2Nth+1 element, has a repeating pattern, the pattern comprising one element including two groups of sections, the first group including N first sections, each of the N first sections being capable of receiving a preceding element transmitted beam from a plurality of preceding element transmitted beams and also being capable of deviating said preceding element transmitted beam in the first direction, and, the second group including N second sections, each of the N second sections being capable of receiving another preceding element transmitted beam from a plurality of preceding element transmitted beams and being capable of deviating said another preceding element transmitted beam in the second direction, and, a next element including two groups of sections, the first group of next element sections including N first sections, each of the N first sections being capable of receiving a preceding element transmitted beam from a plurality of preceding element transmitted beams and also being capable of deviating said preceding element transmitted beam in the second direction, and, the second group including N second sections, each of the N second sections being capable of receiving another preceding element transmitted beam from the plurality of preceding element transmitted beams and being capable of deviating said another preceding element transmitted beam in the first direction.

10. A method for switching optical beams comprising the steps of:
a) selectively deviating in a first direction an upper one of at least two input beams;
b) selectively deviating in a second direction a displaced one of at least two input beams;
c) subsequently selectively deviating in a third direction an upper one of the at least two selectively deviated input beams; and
d) subsequently selectively deviating in a fourth direction a displaced one of the at least two selectively deviated input beams,
wherein deviating is performed by means of a switchable volume grating; and, wherein said first direction corresponds to a first blazing state of a first switchable volume grating, said second direction corresponds to a second blazing state of a second switchable volume grating, said third direction corresponds to a third blazing state of a third switchable volume grating, said fourth direction corresponds to a fourth blazing state of a fourth switchable volume grating.

11. A method for switching optical beams comprising the steps of:
a) selectively deviating in a first direction an upper one of at least two input beams;
b) selectively deviating in a second direction a displaced one of at least two input beams;
c) subsequently selectively deviating in a third direction an upper one of the at least two selectively deviated input beams; and
d) subsequently selectively deviating in a fourth direction a displaced one of the at least two selectively deviated input beams,
wherein the at least two input beams comprise 2N input beams, N being a positive integer greater than one; and wherein the method further comprises the steps of:
repeating steps (a) and (b) for each successive two beams from the 2N input beams, starting at a first input beam; repeating steps (c) and (d) for each successive two beams from the 2N selectively deviated input beams; repeating 2N−1 times a sequence of steps comprising the steps of:
repeating N times the steps of:
subsequently selectively deviating in the first direction an upper one of each successive two beams from the 2N previously selectively deviated beams;
subsequently selectively deviating in the second direction a displaced one of each successive two beams from the 2N previously selectively deviated beams.

12. The method of claim 10 wherein the third direction is the second direction and the fourth direction is the first direction.

13. The method of claim 11 further comprising the step of:
propagating, after repeating executing 2N−2 steps in the repeating sequence, the 2N previously selectively deviated beams through a free space region.

* * * * *